March 10, 1936.    F. MÜLLER    2,033,730
ELECTRODE
Filed April 12, 1933
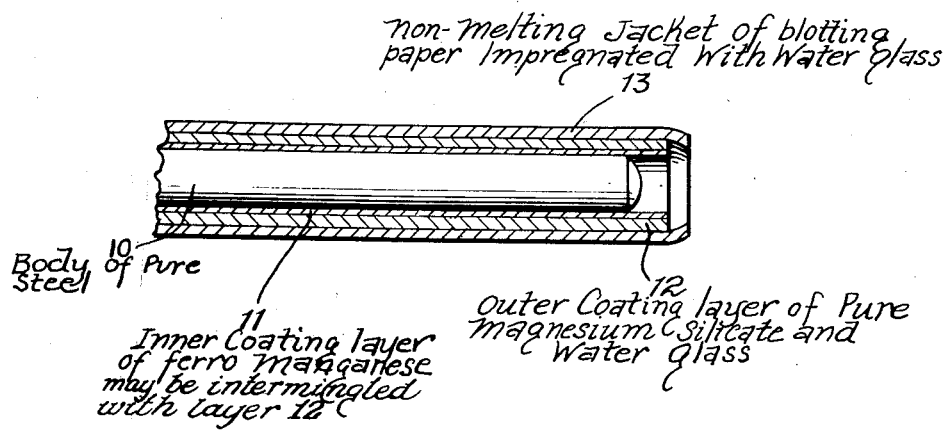

Patented Mar. 10, 1936

2,033,730

UNITED STATES PATENT OFFICE 2,033,730

ELECTRODE

Fritz Müller, Furstenwalde, Germany, assignor to N. V. Machinerieen-en Apparaten Fabrieken "Meaf", Utrecht, Netherlands Application April 12, 1933, Serial No. 665,690
In Germany April 12, 1932

10 Claims. (Cl. 219—8)

This invention relates to an electrode for arc welding.

In arc-welding steel with steel electrodes oxygen and nitrogen are taken up by the molten material from the surrounding air during the welding process whereby the properties of the melted down material are impaired to a considerable degree. In particular, the material will be rendered brittle. Impact resistance amounting to about 15 to 30 kg. m/sq. cm. decreases in the weld to about 1 kg. m/sq. cm. if electrodes of soft carbon steel are used without coating. Welds of this type are of course much endangered if subjected to occasional intermittent stresses or if surface cracks are formed by expansion due to heat or the like. Such welds cannot be used in welded joints whose bursting would bring about dangerous results, as for instance in steam boilers.

By employing alloy constituents in the electrode steel, such as manganese, which combine more readily with the oxygen of the air than iron and whose oxides are less detrimental to the quality of the weld, impact resistance could be increased to about 5 kg. m/sq. cm. Another method consists in coating the electrodes to keep the air away from the arc. Most coatings, however, have practically no influence on the impact resistance of the weld, as they are either too thin to be effective or contain substances which bring about oxidation or other pollutions of the weld. Only some coatings, possibly in combination with alloy constituents in the steel core of the electrode, insure impact resistance values with respect to welds amounting approximately to 5 to 10 kg. m/sq. cm., but disclose, on the other hand, the drawback that the alloy constituents as well as the coatings having a favorable effect upon impact resistance involve at the same time a considerable porosity of the weld, which means leaks and insufficient strength. Furthermore, considerable pores in the fracture of the impact test pieces may result in higher impact work than the same material would show in pore free condition, so that pores will make the impact resistance appear greater than it actually is. These pores—gas bubbles—are a result of chemical conversions taking place in the molten welding material under the action of the oxygen of the air, of the alloy constituents of the core of the electrode and of the constituents of the coating.

After long and thorough experiments I have succeeded in producing an electrode providing a weld that is practically free from pores and whose impact resistance may be rendered approximately equal to that of the rolled basic material.

The accompanying drawing illustrates diagrammatically one embodiment of the invention and the figure represents the electrode fragmentarily and in vertical section.

Reference character 10 represents the body or steel core of the electrode which is made from the purest charge of iron in an acid open hearth furnace and is surrounded by a coating 11, 12 and outside the coating a paper jacket 13 impregnated with water glass. The coating may consist of two layers the inner one of which 11 is composed of ferromanganese while the outer layer 12 consists of magnesium silicate and water-glass. When layers 11 and 12 are combined into one, this consists of magnesium silicate and water glass with the addition of water glass.

It was necessary, above all, to employ a particularly pure steel for the core 10 of the electrode, a step which is known to be essential for the quality of a weld. Better results than pure steel obtained by other methods, such as melting in the electric furnace, were, however, procured by a steel made from purest crude iron and produced in an acid open hearth furnace. This steel is free from impurities entering into the steel, or remaining therein, under other methods and having a detrimental influence upon the weld, though the amount thereof present in the steel is so slight that the usual analysis fails to reveal them.

It was further necessary to employ a coating free from constituents which act detrimentally on the weld. Such a coating 12 was obtained from a mixture of substantially pure magnesium silicate, that is to say the purest magnesium silicate to be had, such as talc, and water glass. The coating must be constructed so as to form in known manner a slightly projecting crater surrounding the melting off end of the electrode and partly enveloping the arc to protect it against air. The melting coating forms a glass flux which drops from the edge of the crater, is partly evaporated by the high temperature of the arc and affords further protection, particularly by covering airtight the steel pool in the form of a liquid layer of slag. It is of essential importance that the coating is free from constituents which would have a detrimental effect upon the steel during close contact with the molten steel at high temperature, especially by transmitting oxygen and other impurities thereto, as would be the case, for instance, with constituents giving off contents of carbonic acid or easily reducible oxides.

Therefore, the coating should even in solid condition cover the welding rod as a dense and homogeneous mass and should preferably not have a porous or fibrous structure to prevent the absorption of moisture and other impurities prior to use. In melted condition, the slag is thinly liquid and wets the steel well so as to spread evenly without forming local accumulations. It should further be incapable of absorbing oxygen from the air at the high temperature and transmitting it to the molten steel.

To increase its efficiency the coating may receive additions, such as ferromanganese, which will absorb any atmospheric oxygen entering without forming detrimental impurities or which will increase the quality of the melted down steel by giving off alloy constituents, such as manganese, molybdenum or the like.

It has been found that such additions are most effective when located as closely as possible to the steel core as by a layer 11. In order to attain this object several coating layers may be superposed on one another, and the inner layer may chiefly contain the additions.

Electrodes of pure steel provided with a coating according to the invention will produce welds practically free from pores and possessing an impact resistance of approximately 10 to 15 kg. m/sq. cm.

Impact resistance has been further increased by providing the coating described with a jacket 13 of non-melting material for extending the arc-protecting crater and thus shutting the air out still more. A covering of paper impregnated with water glass in known manner to be fireproof to a certain extent has given good satisfaction. The melting inner coating will then flow down inside on the projecting paper crater which will be heated thereby to such a degree that the water glass absorbed by it will melt and mix with the inner coating while the paper burns off outwardly or crumbles away mechanically after carbonization.

The paper must of course not contain constituents detrimental to welding, as they would enter the slag and thence the molten steel. Best results have been obtained with a very pure blotting paper which possesses also the necessary absorbing capacity for taking up a sufficient quantity of water glass which, according to experiments, preferably consists of a mixture of potassium and sodium silicate.

By means of this improved protection the impact resistance of the weld will be increased to 20 kg. m/sq. cm. and more while there are practically no pores. Tensile strength and extensibility are also very good and uniform. Bending angles of 180° are regularly attained if the welding is done properly, even with the largest thicknesses of the basic material that are used in practical operation.

I claim:—

1. An electrode for arc-welding comprising a core, a coating which is composed mainly of substantially pure magnesium silicate and water glass, and a paper jacket which surrounds the coating impregnated with water glass.

2. An electrode for arc-welding, comprising a core, a coating which is composed mainly of substantially pure magnesium silicate and water glass, and a jacket of blotting paper which surrounds the coating and is impregnated with water glass.

3. An electrode for arc-welding, comprising a core, a coating which is composed mainly of substantially pure magnesium silicate and water glass, and a paper jacket which surrounds the coating and is impregnated with water glass, the said coating and jacket extending to beyond the melting end of the electrode core to form a crater therefor.

4. An electrode for arc-welding, comprising a core, a coating which with the addition of ferro-manganese is composed mainly of substantially pure magnesium silicate and waterglass, and an externally exposed paper jacket which surrounds the coating and is impregnated with water glass.

5. Electrode for arc-welding, comprising an electrode core melted from the purest charge of iron in an acid open hearth furnace, a coating which with the addition of ferro-manganese is composed mainly of substantially pure magnesium silicate and water glass, and an externally exposed paper jacket which surrounds the coating and is impregnated with water glass.

6. An electrode for arc-welding, comprising an electrode core melted from the purest charge of iron in an acid open hearth furnace, an inner coating layer which with the addition of ferro-manganese is composed mainly of substantially pure magnesium silicate and water glass, and an outer coating layer which is composed mainly of technically pure magnesium silicate and water glass, and an externally exposed paper jacket, which surrounds the said coating layer and is impregnated with water glass.

7. An electrode for arc-welding comprising a steel core, a coating of magnesium silicate and water glass around said core, and a surrounding jacket of paper impregnated with water glass.

8. An electrode for arc-welding comprising a steel core, a coating of magnesium silicate and water glass around said core, and a surrounding jacket of paper impregnated with water-glass, said coating and jacket projecting beyond the melting end of the core to form a crater around it.

9. An electrode for arc-welding comprising a steel core, a coating around said core of magnesium silicate and water glass with addition of ferro-manganese, and a surrounding jacket of paper impregnated with water glass.

10. An electrode for arc-welding comprising a core of steel produced from purest crude iron in an acid open hearth furnace, an inner coating layer of ferro-manganese, an outer coating layer of magnesium silicate and water glass constituting a dense, homogeneous mass and a surrounding jacket of blotting paper impregnated with water glass.

FRITZ MÜLLER.